United States Patent
Nemesh et al.

(10) Patent No.: US 9,673,492 B2
(45) Date of Patent: Jun. 6, 2017

(54) ACTIVELY-SWITCHED DIRECT REFRIGERANT BATTERY COOLING

(71) Applicant: GM GLOBAL TECHNOLOGY OPERATIONS LLC, Detroit, MI (US)

(72) Inventors: Mark D. Nemesh, Troy, MI (US); John T. Guerin, Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 307 days.

(21) Appl. No.: 14/488,995

(22) Filed: Sep. 17, 2014

(65) Prior Publication Data

US 2016/0079637 A1    Mar. 17, 2016

(51) Int. Cl.
*H01M 10/625* (2014.01)
*H01M 10/6556* (2014.01)
*H01M 10/6565* (2014.01)
*H01M 10/613* (2014.01)
*H01M 10/63* (2014.01)
*H01M 10/6569* (2014.01)
*H01M 10/617* (2014.01)

(52) U.S. Cl.
CPC ....... *H01M 10/625* (2015.04); *H01M 10/613* (2015.04); *H01M 10/617* (2015.04); *H01M 10/63* (2015.04); *H01M 10/6556* (2015.04); *H01M 10/6569* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,582,765 A | * | 4/1986 | Kothmann | H01M 8/04014 165/97 |
| 2004/0137313 A1 | * | 7/2004 | Jaura | H01M 10/63 429/62 |
| 2006/0060661 A1 | * | 3/2006 | Bourgault | F24F 5/0089 237/2 A |

(Continued)

FOREIGN PATENT DOCUMENTS

| | | | | |
|---|---|---|---|---|
| DE | 102007017172 | * | 10/2008 | ........ H01M 10/5004 |
| WO | WO 2012/143152 | * | 10/2012 | .............. H01M 8/04 |

*Primary Examiner* — Ula C Ruddock
*Assistant Examiner* — Amanda Barrow
(74) *Attorney, Agent, or Firm* — Quinn IP Law

(57) ABSTRACT

A thermal management system for a battery pack having a conductive cooling plate and battery cells includes a compressor, flow control valves, temperature sensor(s), and a controller. The compressor circulates refrigerant through the plate to cool the cells. The temperature sensor measures a temperature of the battery pack. The controller is programmed to receive the temperature from the temperature sensors and selectively transmit switching control signals to the valves to command a change in direction or flow of the refrigerant through the cooling plate. This limits a temperature variance between the battery cells over time. A vehicle includes a transmission, an electric traction motor, a battery pack, and the thermal management system noted above. A method includes receiving the temperature, transmitting switching control signals to the valves, and controlling a flow of refrigerant through the plate via the valves in response to the switching control signals.

12 Claims, 3 Drawing Sheets

(56) References Cited

U.S. PATENT DOCUMENTS

| | | | | |
|---|---|---|---|---|
| 2009/0249802 | A1* | 10/2009 | Nemesh | B60H 1/00278 |
| | | | | 62/56 |
| 2011/0189511 | A1* | 8/2011 | Yoon | H01M 10/48 |
| | | | | 429/50 |
| 2011/0281145 | A1* | 11/2011 | TenHouten | H01M 10/6567 |
| | | | | 429/50 |
| 2012/0053010 | A1* | 3/2012 | Kuang | B60K 6/445 |
| | | | | 477/3 |
| 2012/0148889 | A1* | 6/2012 | Fuhr | H01M 2/1077 |
| | | | | 429/87 |
| 2013/0130076 | A1* | 5/2013 | Lee | B60L 11/187 |
| | | | | 429/62 |
| 2013/0323543 | A1* | 12/2013 | Grunwald | H01M 10/486 |
| | | | | 429/50 |
| 2014/0102688 | A1* | 4/2014 | Doege | G05D 23/1919 |
| | | | | 165/287 |

* cited by examiner ated States Patent US 9,673,492 B2

ACTIVELY-SWITCHED DIRECT REFRIGERANT BATTERY COOLING

TECHNICAL FIELD

The present disclosure relates to actively-switched direct refrigerant cooling for a battery.

BACKGROUND

Battery electric vehicles, extended range electric vehicles, and strong hybrid electric vehicles are propelled using motor torque from one or more electric traction motors. The motors may draw electrical energy from or deliver a charge to the various battery cells of a rechargeable battery pack depending on the vehicle operating mode. The battery pack may include multiple rows of battery cells that collectively generate a substantial amount of heat during vehicle operation. As a result, thermal management systems are used to help regulate the temperature of the battery pack.

Thermal management systems are typically configured with a fluid pump and a supply of liquid coolant. The fluid pump circulates the coolant through a closed loop of conduit to cool the battery cells and associated power electronics. One or more heat exchangers, condensers, evaporators, and other fluid handling components extract the heat from the coolant after the coolant exits the battery pack. Direct refrigerant cooling systems are used in some emerging vehicle designs as an alternative technique for battery cooling. Direct refrigerant cooling systems, which forego some of the complexity of conventional coolant loops, use a supply of refrigerant to conductively cool the various battery cells.

SUMMARY

A direct refrigerant thermal management system is disclosed herein. The system is suitable for use in cooling a battery pack having battery cells that are serially arranged in multiple rows. As part of the system, a controller is programmed to selectively open and close a set of flow control valves, e.g., a pair of 3-way flow control valves and an optional pair of on/off shutoff valves, in response to changing battery temperature and/or other thermal control inputs. In this manner, the controller is able to command a change in flow direction or flow concentration of refrigerant through a cooling plate of the battery pack. Operation of the controller as set forth herein is intended to limit the extent of a long-term temperature variance between individual battery cells, and to thereby expand the use of direct refrigerant cooling techniques to large and/or asymmetrical battery pack designs.

In a particular embodiment, a direct refrigerant thermal management system is disclosed for use with a battery pack having a conductive cooling plate and plurality of battery cells arranged serially, i.e., in one or more rows. The battery cells are in direct contact or thermally conductive communication with the cooling plate. The system includes a compressor, control valves, temperature sensors, and a controller. The compressor is operable for circulating a suitable refrigerant through the cooling plate in order to cool the individual battery cells. The control valves are in fluid communication with the compressor. The temperature sensors, which are positioned with respect to the battery cells, are configured to measure temperature data.

In this example embodiment, the controller is programmed to receive the temperature data from the temperature sensors and to selectively transmit switching control signals to the control valves to change the direction or a concentration of a refrigerant flowing through the battery pack. The controller may selectively disable flow through a particular portion of the battery pack, for instance through half of the rows of battery cells, so as to concentrate the flow in a particular portion of the battery pack. The portions/halves can be alternated so as to balance temperature while in such a cooling mode.

An intended net effect of the control logic executed by the present controller is to limit cell-to-cell temperature differences over time via active switching control. As the battery cells are arranged in series, the performance and lifespan of the battery pack is largely limited by the performance of its most degraded battery cells. Use of the presently disclosed controller and associated control method is thus intended to help ensure that the various battery cells of a battery pack decay at approximately the same rate.

A vehicle is also disclosed herein that includes a transmission, an electric traction motor, a battery pack, and the thermal management system described above. The electric traction motor is operable for delivering motor torque to the transmission. The battery pack, which is electrically connected to the electric traction motor, includes a conductive cooling plate and plurality of battery cells. Each of the battery cells is in direct thermal communication with the conductive cooling plate.

A method of controlling a thermal management system for a battery pack includes receiving temperature data from temperature sensors via a controller while refrigerant is circulated through the conductive cooling plate via a compressor. The method also includes selectively transmitting switching control signals via a controller to flow control valves positioned between the compressor and battery pack in response to the received temperature data. A flow of refrigerant through the conductive cooling plate is controlled via the flow control valves in response to the switching control signals, thereby limiting a temperature variance between the battery cells over time.

The above features and other advantages and features of the present disclosure are readily apparent from the following detailed description when taken in connection with the accompanying drawings.

DETAILED DESCRIPTION

Figure 1:
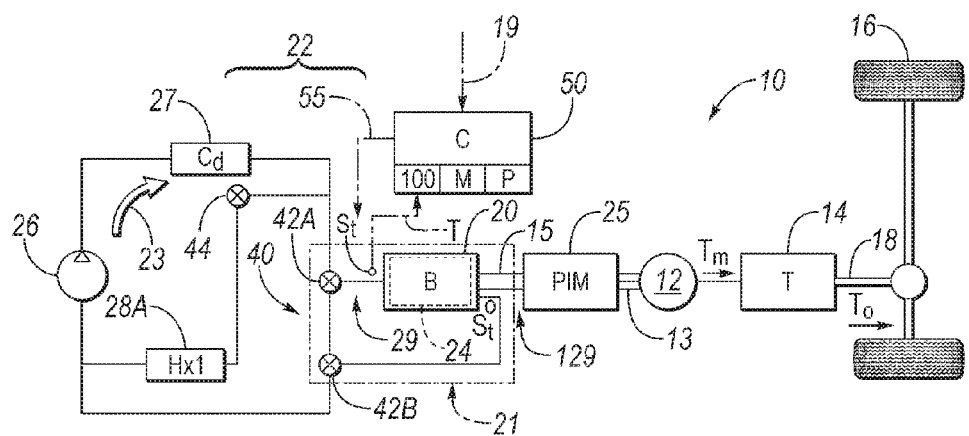
FIG. 1 is a schematic illustration of a vehicle having a high-voltage DC battery pack, a thermal management system, control valves, and a controller programmed to actively switch the control valves according to a method as disclosed herein.

Referring to the drawings, wherein like reference numerals refer to the same structure throughout the various Figures, an example vehicle 10 is shown schematically in FIG. 1. The vehicle 10 may be embodied variously as a hybrid electric vehicle, an extended-range electric vehicle, a battery electric vehicle, or any other vehicle or other system design having a direct current (DC) battery pack (B) 20 with a plurality of battery cells 30 as best shown in FIGS. 2A-3B. The temperature of the battery pack 20 is regulated via actively-switched direct refrigerant cooling as described in detail below. For simplicity, an internal combustion engine is omitted from the drawings, but could be included in vehicle designs requiring engine torque for any purpose.

Figure 2A:
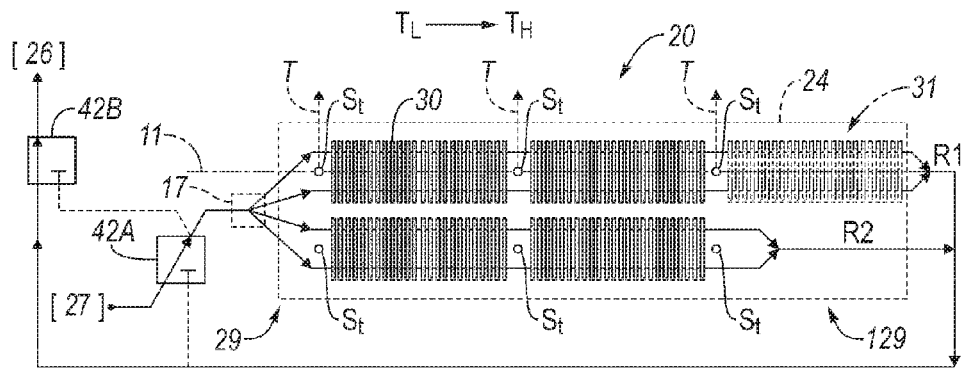
FIG. 2A is a schematic illustration of example elongated symmetrical and asymmetrical designs for the battery pack of FIG. 1 in a first cooling mode and flow direction.
Figure 2B:
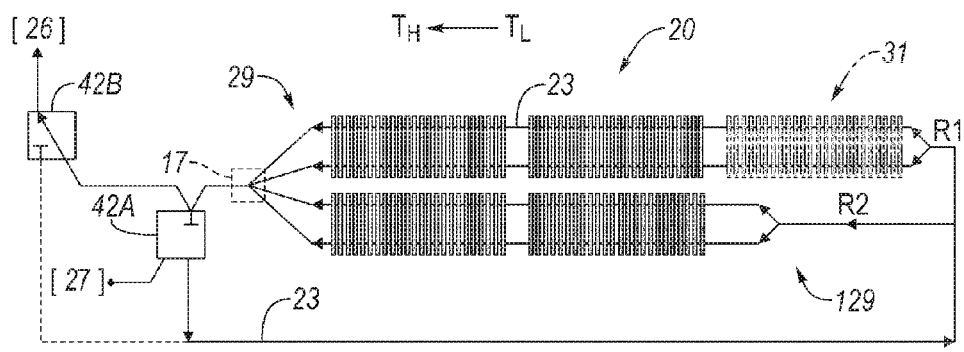
FIG. 2B is a schematic illustration of example elongated symmetrical and asymmetrical designs for the battery pack of FIG. 1 in a second cooling mode and flow direction, i.e., a reverse of the flow direction shown in FIG. 2A.
Figure 3A:
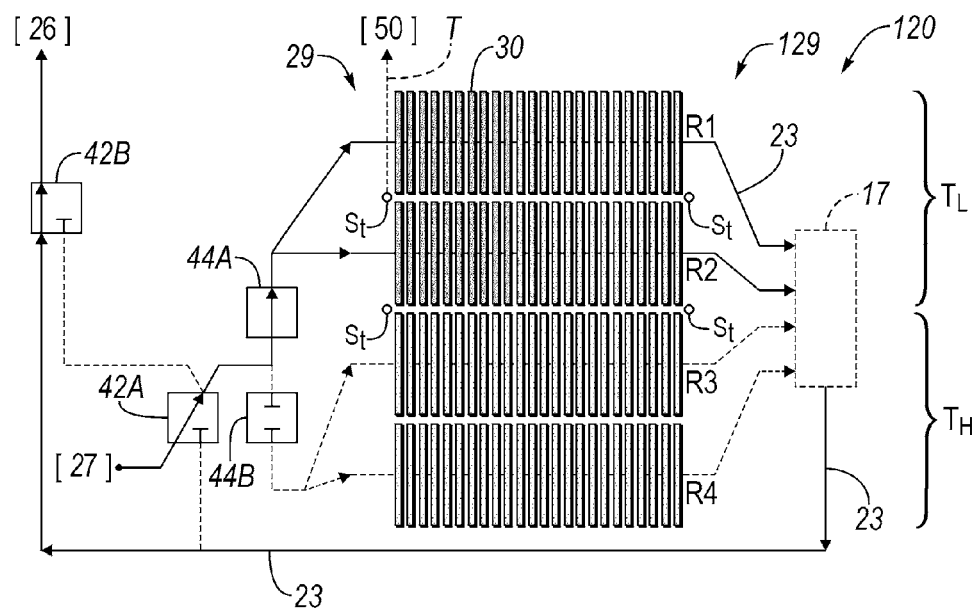
FIG. 3A is a schematic illustration of an example square/symmetrical design for the battery pack of FIG. 1 utilizing additional flow control valves to provide a third cooling mode.
Figure 3B:
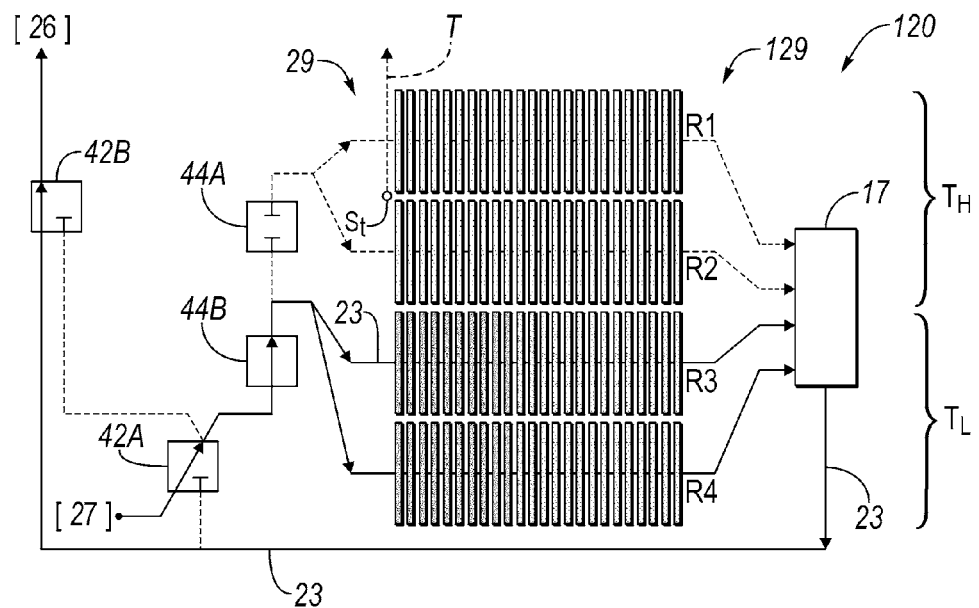
FIG. 3B is a schematic illustration of an example square/symmetrical design for the battery pack of FIG. 1 showing a fourth cooling mode with a different concentration of flow relative to the third cooling mode of FIG. 2A.

It is recognized herein as a basis of the disclosed design that any of the battery cells 30 located in close proximity to a fluid outlet of a given battery pack, e.g., the example battery pack 20 of FIG. 1, tend to have a relatively high average temperature with respect to battery cells 30 located in close proximity to a fluid inlet. Warmer battery cells 30 also tend to degrade more quickly over time relative to cooler battery cells 30. This is one reason that conventional direct refrigerant cooling techniques, which operate via direct conduction of heat away from the battery cells 30 rather than circulation of liquid coolant via a fluid pump, are typically limited to relatively small square or symmetrical battery pack designs. A controller (C) 50 is therefore programmed as part of the present approach to execute logic embodying a method 100 to extend direct refrigerant cooling techniques to a broader range of potential battery pack designs, including elongated/linear designs as shown in FIGS. 2A and 2B and larger square/symmetrical designs such as are depicted in FIGS. 3A and 3B.

An electric traction motor 12 is used in the vehicle 10 of FIG. 1 as an example device consuming large amounts of power from the battery pack 20. The electric traction motor 12 is electrically connected to a power inverter module (PIM) 25 via an alternating current (AC) voltage bus 13. The PIM 25 in turn is electrically connected to the battery pack 20 via a DC voltage bus 15. As is well known in the art, operation of a power inverter such as the PIM 25 typically involves the rapid switching of semiconductor switches, e.g., IGBTs or MOSFETS, via pulse width modulation, along with power filtering to convert DC power from the battery pack 20 into AC power usable by the electric traction motor 12 and vice versa. Other components omitted from FIG. 1 for simplicity may include an auxiliary power module or voltage regulator, additional electric traction motors 12, and the like.

The electric traction motor 12 of FIG. 1 delivers motor torque (arrow $T_M$) to a transmission (T) 14. Output torque (arrow $T_O$) from the transmission 14 ultimately powers a set of drive wheels 16 via an output member 18. While an automotive vehicle is depicted in FIG. 1, any system utilizing the battery pack 20 and direct refrigerant cooling techniques may benefit from use of the disclosed design. Therefore, while the example vehicle 10 is described hereinafter for illustrative consistency, the present approach is not limited to such a system.

Figure 4:
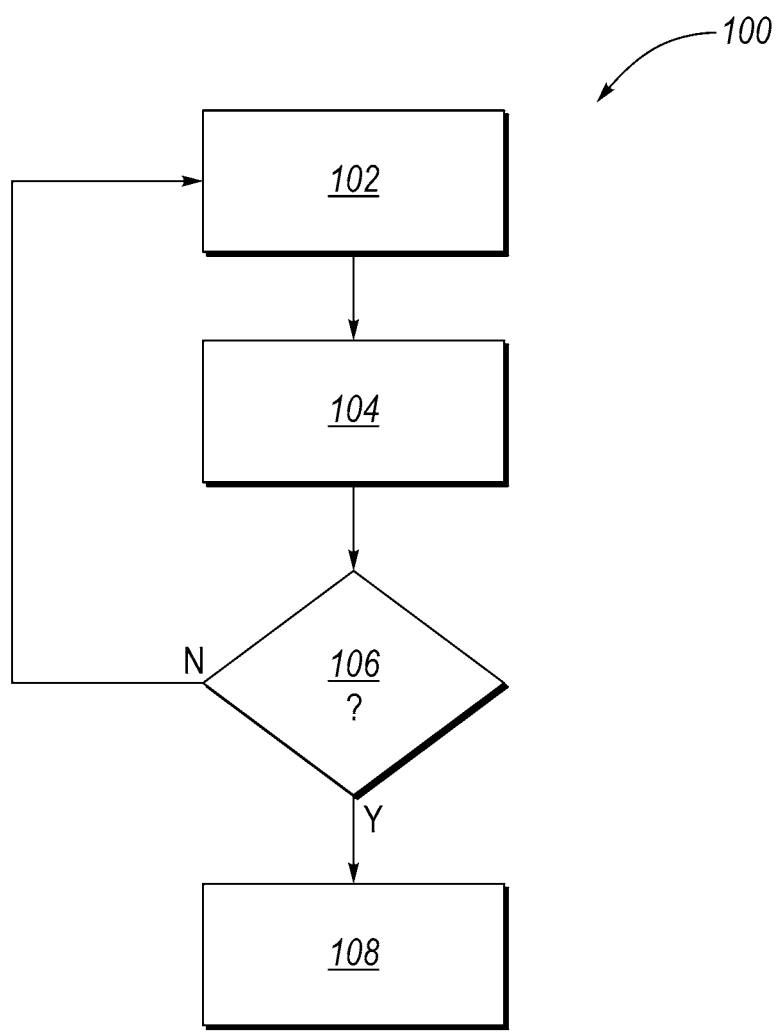
FIG. 4 is a flow chart describing a method for actively switching a set of flow control valves to cool serial battery cells of the various example battery packs shown in FIGS. 1-3B.

The controller 50 of FIG. 1 is programmed to automatically regulate the temperature of the battery pack 20 via the method 100, an example of which is shown in FIG. 4 and described below. Operation of the controller 50 regulates the temperature of the battery pack 20 in part via active switching control of a refrigerant thermal management system 22. Active switching control helps maintain the individual battery cells 30 of the battery pack 20 at a relatively constant temperature.

The example battery pack 20 shown in FIGS. 1, 2A, and 2B, as well as the alternative large symmetrical embodiment of FIGS. 3A and 3B, may include a conductive cooling plate 24 constructed of a suitable thermally conductive material such as copper, aluminum, or carbon steel. The cooling plate 24 may define an internal cavity, channels, or cavities (not shown) through which refrigerant (arrow 23) can freely flow through a first or second fluid port 29 or 129, respectively. The cooling plate 24 is in conductive thermal communication with each of the battery cells 30, e.g., in close proximity or in direct contact with each of the battery cells 30. The battery cells 30 are thus cooled via conduction by operation of the thermal management system 22.

The refrigerant (arrow 23), which may be a commercially available refrigerant such as R134a, R1234YF, or R744, is directed through the battery pack 20 to dissipate heat from the various battery cells 30 during operation of the vehicle 10. The thermal management system 22 shown in FIG. 1 includes a compressor 26 that ultimately circulates the refrigerant (arrow 23) to a condenser (Cd) 27. As will be appreciated by those having ordinary skill in the art, the thermal management system 22 may also include additional fluid control components so as to fully embody an air conditioning system suitable for cooling a passenger compartment of the vehicle 10.

The thermal management system 22 in the embodiment of FIG. 1 also includes a heat exchanger (HX1) 28A and a battery cooling system 21 having a battery cooling plate 24. Outlet flow of refrigerant (arrow 23) from the compressor 26 can be divided into two streams. The heat exchanger 28A in this instance may be dedicated to the cooling of the cabin or passenger compartment of the vehicle 10, while a second heat exchanger, e.g., the battery cooling plate 24, is dedicated to cooling the battery pack 20.

A shutoff valve 44 may be used to either shut-off or reduce a flow of the refrigerant (arrow 23) to the heat exchanger 28A, e.g., when cooling of a passenger compartment is not required or if a cooling load of the battery pack 20 requires all the flow output of refrigerant (arrow 23) circulated by or flowing from the compressor 26. Control of the shutoff valve 44 may be achieved via selectively transmitting a switching control signal (arrow 55) to the valve 44 using the controller 50. The present design thus eliminates the need for a dedicated liquid coolant loop and associated components, such as a fluid pump of the type described above, by taking advantage of the presence of existing air conditioning system components.

The controller 50, the function of which is described in greater detail below with reference to FIGS. 2A-3B, is in communication with the various components of the thermal management system 22, for instance over a controller area network (CAN) bus or a serial communications bus of the types known in the art. The controller 50 executes logic embodying the method 100 from memory M via a processor P so as to maintain the various battery cells 30 at a relatively constant temperature, i.e., with little variance between the average temperatures of the coldest and hottest of the battery cells 30 over time.

Execution of the method 100 allows the controller 50 to perform active switching control of a plurality of flow control valves 40 of the thermal management system 22, i.e., valves 42A, 42B, 44, 44A, and 44B. The structure and function of the various valves are described below with reference to FIGS. 2A-3B. For example, FIGS. 2A and 2B describe a possible embodiment using first and second 3-way flow control valves 42A and 42B and their use in the temperature control of elongated symmetrical or asymmetrical battery pack 20. The embodiment of FIGS. 3A and 3B adds a pair of optional shutoff valves 44A and 44B to extend the method 100 to use with larger square/symmetrical battery packs 120, e.g., square battery packs having four or more rows of battery cells 30. Such a symmetrical design lends itself to division of the battery pack 20 into portions or halves and the selective concentration of a flow of the refrigerant (arrow 23) into one half or the other, as explained below.

The controller 50 of FIG. 1 may be embodied as a digital computer having, as the memory M, sufficient tangible, non-transitory memory such as read only memory (ROM), flash memory, and/or other magnetic or optical storage media. The controller 50 also includes sufficient random access memory (RAM), electrically-erasable programmable read only memory (EEPROM), and the like. Additionally, the controller may include a high-speed clock, analog-to-digital and digital-to-analog circuitry, and input/output circuitry and devices, as well as appropriate signal conditioning and buffer circuitry to provide a fully functional hardware and software control device. Temperature data (arrow T) from temperature sensors ($S_T$) located in or around the battery pack 20 and input signals (arrow 19) describing a speed or flow rate of the compressor 26 are received by the controller 50 and used to selectively generate switching control signals (arrow 55). The timing and purpose of the switching control signals (arrow 55) will now be described with reference to FIGS. 2A-4.

Referring to FIGS. 2A and 2B, the battery pack 20 of FIG. 1 is shown in an example elongated symmetrical configuration in which the battery cells 30 are arranged in rows R1 and R2 along a pair of parallel longitudinal axes 11. An asymmetrical variation is shown in phantom wherein one of the rows R1 is longer than the other row R2, i.e., more battery cells 30 are used in row R1, as indicated by arrow 31. Both symmetrical and asymmetrical designs are controlled in the same manner using the longest run of battery cells 30 for temperature control as explained below. Additional rows may be envisioned without departing from the intended inventive scope.

The battery cells 30 all rest on or are positioned in close proximity to the conductive cooling plate 24, and thus are in thermal communication with the cooling plate 24. The refrigerant (arrows 23) flows through the cooling plate 24 to help reduce the temperature of the battery cells 30. The flow of refrigerant (arrow 23) is shown schematically in FIGS. 2A-3B for illustrative clarity. In an actual embodiment, the flow of refrigerant (arrow 23) may be through multiple channels or interior cavities of the cooling plate 24 and/or in or around the individual battery cells 30 depending on the design.

FIG. 2A depicts a first cooling mode in which the refrigerant (arrows 23) flows from the condenser 27 of FIG. 1 through the first flow control valve 42A and into the first fluid ports 29 of the battery pack 20, e.g., through a manifold 17 as shown schematically in FIGS. 2A-3B for illustrative simplicity. The first fluid ports 29 act as a fluid inlet to the battery pack 20 in the first cooling mode. The refrigerant (arrows 23) is at its coldest temperature, and thus is in a liquid state as it enters the battery pack 20 and directly cools the first few battery cells 30 in rows R1 and R2. The refrigerant (arrows 23) gradually boils off as it extracts heat from the battery pack 20, and thereby begins to change from a liquid state into a vapor or gaseous state. The state change corresponds to the high and low temperature flow direction indicated by $T_H$ and $T_L$, respectively, in FIGS. 2A-3B, with low temperature ($T_L$) corresponding to a predominantly liquid state of the refrigerant (arrows 23) and high temperature ($T_H$) corresponding to a predominantly gaseous state of the refrigerant (arrows 23). In other words, the refrigerant (arrows 23) is almost entirely gaseous upon its exit from the battery pack 20 through the second fluid ports 129, with the fluid ports 129 acting in the first cooling mode of FIG. 2A as a fluid outlet.

The refrigerant (arrows 23) exiting the second fluid ports 129 in the first cooling mode flows through the second flow control valve 42B and returns to the compressor 26 of FIG. 1. Therefore, in the cooling mode depicted in FIG. 2A a flow path from the first flow control valve 42A to the second control valve 42B is blocked. To achieve such a flow direction, the first and second flow control valves 42A and 42B may be embodied as 3-way flow control valves as shown or any other valve design suitable for performing the commanded functions.

As refrigerant (arrows 23) in a vapor state cools less efficiently than it does when in a liquid state, the battery cells 30 that are located nearest the second fluid ports 129 in FIG. 2A will, over time, tend to be warmer than those closest to the first fluid ports 29. Therefore, the controller 50 of FIG. 1 is programmed to receive the temperature data (arrow T) from the temperature sensors ($S_t$) distributed through the battery pack 20, and also to switch the respective first and second flow control valves 42A and 42B to enter a second cooling mode as shown in FIG. 2B.

The temperature sensors ($S_t$) may be embodied as thermocouples or other temperature sensors positioned at or in close proximity to the respective first and second fluid ports 29 and 129. Additional temperature sensors ($S_t$) may be positioned at other locations within the battery pack 20 in other embodiments. The controller 50 processes the received temperature data (arrow T) and determines when to reverse or concentrate the flow of refrigerant (arrows 23) with respect to the various battery cells 30. For instance, the controller 50 may be programmed with a calibrated temperature threshold above which the controller 50 reverses the flow or concentrates the flow in one half of the battery pack 20 or the other. In some embodiments, the controller 50 may also determine a powertrain operating mode, e.g., when the vehicle 10 of FIG. 1 is idling or the compressor 26 is otherwise running above or below a threshold speed, and may determine the frequency of switching based on this additional information.

In the second cooling mode depicted in FIG. 2B, the first flow control valve 42A is actuated via the switching control signals (arrow 55) from the controller 50. The switching control signals (arrow 55) cause the first flow control valve 42A to block the flow of the refrigerant (arrows 23) to the first fluid ports 29 and to instead direct the flow of the refrigerant (arrows 23) through the battery pack 20 via the second fluid ports 129. The second fluid ports 129 now act as the fluid inlet and the first fluid ports 29 act as the fluid outlet. The flow from the first fluid ports 29 passes through the second 3-way control valve 42B and returns to the compressor 26 of FIG. 1. Again, as the longest run of battery cells 30 will tend to have the highest outlet temperature, the decision as to when to switch the first and second flow control valves 42A and 42B via the controller 50 may be predicated on the temperatures measured at the first and second fluid ports 29 and 129. A single inlet and outlet temperature measurement may suffice when the rows of battery cells 30 are of the same length.

Referring to FIG. 3A, a square/symmetrical battery packs 120 presents a different potential temperature control problem. When the compressor 26 of FIG. 1 is running at medium to high rates of speed, such as when the vehicle 10 is not idling and/or when a load on the battery pack 120 is otherwise relatively high, the rate of flow of the refrigerant (arrows 23) is likewise relatively high. For such conditions, flow control may be performed according to FIGS. 2A and 2B as set forth above. The controller 50 for instance could alternate between the cooling modes of FIGS. 2A and 2B, such as by running in the first cooling mode shown in FIG. 2A for a set length of time or until the measured temperature data (arrow T) at the second fluid ports 129 reaches a threshold temperature before switching to the second cooling mode of FIG. 2B for the same length of time.

However, at times ambient temperature is relatively cold and/or the compressor 26 of FIG. 1 does not run very fast. In a symmetrical design such as is shown in FIGS. 3A and 3B, this can result in an already low mass flow rate of the refrigerant (arrow 23) being divided over multiple rows R1, R2, R3, and R4 of battery cells 30. Even if one uses the above-described approach for FIGS. 2A and 2B, i.e., alternating the flow direction, in such circumstances the battery cells 30 may not be maintained at an optimal temperature.

Therefore, in an optional embodiment flow concentration can be alternated between portions or halves of the battery pack 120, e.g., by cooling only the rows R1 and R2 as shown in FIG. 3A and then cooling only the rows R3 and R4 shown in FIG. 3B. In such an embodiment, respective first and second shutoff valves 44A and 44B as shown in phantom may be added to the thermal management system 22. When used in medium/high flow conditions noted above, the shutoff valves 44A and 44B remain open and thus do not affect flow control. When low flow conditions are present, as communicated to the controller 50 via the input signals (arrow 19 of FIG. 1), the on/off states of the shutoff valves 44A and 44B are controlled via the controller 50 in order to alternately cool separate halves or designated rows R1-R4 of the example four-row battery pack 120.

The first shutoff valve 44A may be positioned between the first flow control valve 42A and half of the first fluid ports 29, e.g., those of the first fluid ports 29 in fluid communication with rows R1 and R2. The second shutoff valve 44B may be positioned between the first flow control valve 42A and the other half of the first fluid ports 29, i.e., those of the first fluid ports 29 in fluid communication with remaining rows R3 and R4. Thus, both of the shutoff valves 44A and 44B are positioned downstream of the first flow control valve 42A.

In FIG. 3A, for low-flow conditions of the compressor 26 of FIG. 1 the first shutoff valve 44A is commanded open by the controller 50, via the switching control signals (arrow 55 of FIG. 1), such that the refrigerant (arrows 23) flows from the first flow control valve 42A, through the first shutoff valve 44A, and into rows R1 and R2 of the battery pack 20. When the temperature data (arrow T) from the temperature sensors (S$_T$) located at the fluid ports 29 and/or 129 of rows R3 and R4, i.e., the portion of the battery pack 120 not presently being cooled in the third cooling mode of FIG. 3A, reaches a threshold temperature or if a threshold or after a calibrated amount of time or number of key cycles, the controller 50 can transmit the switching control signals (arrow 55) to the first and second shutoff valves 44A and 44B, respectively, to change to the fourth cooling mode of FIG. 3B.

Referring to FIG. 3B, a fourth cooling mode is entered without altering the valve port settings or open/closed states of the first and second flow control valves 42A and 42B from the configuration shown in FIG. 3A. Instead, the on/off states of the two shutoff valves 44A and 44B are simply reversed such that the second shutoff valve 44B is now open and the first shutoff valve 44A is now closed. In this manner, refrigerant (arrows 23) enters rows R3 and R4 and no longer enters rows R1 and R2. Refrigerant (arrows 23) ultimately passes from the fluid ports 129 and returns via the second flow control valve 42B to the compressor 26 shown in FIG. 1. Using the third and fourth cooling modes of FIGS. 3A and 3B, therefore, flow of the refrigerant (arrows 23) is alternately divided between designated portions or halves of the symmetrical battery pack 120 during periods of low-flow from the compressor 26. This concentrates the already limited amounts of flow of the refrigerant (arrows 23) into a designated portion of the battery pack 120.

In the example embodiments of FIGS. 2A-3B, switching of the various valves 42A, 42B, 44A, and 44C via the controller 50 of FIG. 1 may be based variously on elapsed time, number of key cycles, and/or temperature data (arrow T). Even if the temperature data (arrow T) indicates that the temperature of the battery cells 30 has not reached a calibrated maximum temperature threshold, valve switching may still be commanded periodically by the controller 50. For instance, for elongated or asymmetrical battery packs during periods of relatively high speeds of the compressor 26 or other periods of high battery heat rejection, the controller 50 can switch cooling modes every key cycle.

Referring to FIG. 4, an example embodiment of the method 100 noted above begins at step 102. The controller 50 of FIG. 1 executes an initial cooling mode. The initial cooling mode depends on the particular design of the battery pack 20 or 120 installed in the vehicle 10 of FIG. 1 or in other system. For instance, if an elongated/symmetrical or asymmetrical design is used as shown in FIGS. 2A-2B, step 102 may entail executing one of those two cooling modes, e.g., the first cooling mode of FIG. 2A for illustrative purposes. The controller 50 then executes step 104.

At step 104 the controller 50 receives the input signals (arrow 19) and temperature data (arrow T) as shown in FIG. 1. Again, the input signals (arrow 19) may inform the controller 50 as to the particular speed, flow rate, or mode of the compressor 26, for example via direct measurement or calculation as is known in the art, while the temperature data (arrow T) informs the controller 50 as to the temperature at or near the inlet and outlet of the battery pack 20 or 120. The controller 50 then proceeds to step 106.

Step 106 entails determining, via the controller 50, whether it is necessary to change between the possible cooling modes, such as from the first cooling mode shown in FIG. 2A to the second cooling mode shown in FIG. 2B, or from the third cooling mode of FIG. 3A to the fourth cooling mode of FIG. 3B. In executing step 106, the controller 50 of FIG. 1 may consider whether the received temperature data (arrow T) exceeds a calibrated temperature threshold. Alternatively, the controller 50 may consider whether a timer has expired, or whether a certain calibrated number of key cycles have been executed. The method 100 proceeds to step 108 of a mode change is required. Otherwise, the method 100 repeats step 102.

At step 108, the controller 50 transmits the switching control signals (arrow 55) to the first and second flow control valves 42A and 42B and, if necessary, to the shutoff valves 44A and 44B shown in FIGS. 3A and 3B. In the configuration shown in FIGS. 3A and 3B in particular, if the input signals (arrow 19) received at step 104 indicate that the compressor 26 is running at a high rate of speed, i.e., that the rate of flow of the refrigerant (arrow 23) is relatively high, then step 108 may entail switching only the flow control valves 42A and 42B. That is, both of the shutoff valves 44A and 44B may remain fully open.

As noted above, the thermal management system 22 and the method 100 described above therefore are intended to extent direct refrigerant cooling techniques to linear/symmetrical or linear/asymmetrical designs of a battery pack 20, as well as optimize cooling in larger symmetrical designs. Regardless of the design, the present approach helps maintain the battery cells 30 at a relatively constant or balanced temperature over time. Such temperature balance in turn may help allow the performance of the battery cells 30 to decay at the same rate, thus extending the life of the battery packs 20 and 120 described above.

While the best modes for carrying out the presently disclosed system and method have been described in detail, those familiar with the art to which this disclosure relates will recognize various alternative designs and embodiments may exist within the scope of the appended claims.

The invention claimed is:

1. A thermal management system for a battery pack having a conductive cooling plate and a plurality of battery cells in thermal communication with the conductive cooling plate, the thermal management system comprising:
   a compressor operable for circulating refrigerant through the conductive cooling plate to thereby cool the plurality of battery cells;
   a plurality of flow control valves in fluid communication with the compressor, including a first flow control valve and a plurality of shutoff valves downstream of the first flow control valve, the first control valve being operable for directing the refrigerant through the conductive cooling plate in respective first and second directions of flow of the refrigerant with respect to a longitudinal axis of the battery pack when the first flow control valve is in a first position and a second position, respectively;
   a temperature sensor configured to measure a temperature of the battery pack; and
   a controller in communication with the temperature sensor and with the plurality of flow control valves, wherein the controller is programmed to:
      receive the measured temperature from the temperature sensor;
      selectively transmit switching control signals to the plurality of flow control valves to command a change in direction or concentration of a flow of the refrigerant through the conductive cooling plate of the battery pack, thereby limiting a temperature variance between the battery cells over time;
      receive input signals describing a speed of the compressor; and
      alternate an open/closed state of each of the plurality of shutoff valves when the speed of the compressor is less than a threshold speed, such that the flow of refrigerant is alternately concentrated in a different portion of the battery pack.

2. The thermal management system of claim 1, wherein the plurality of flow control valves includes a second flow control valve operable for directing the refrigerant from the cooling plate to the compressor regardless of the direction of flow of the refrigerant through the cooling plate.

3. The thermal management system of claim 2, wherein the first and second flow control valves are 3-way flow control valves.

4. The thermal management system of claim 1, further comprising a heat exchanger, wherein the plurality of flow control valves includes an additional shutoff valve in fluid communication with and upstream of the heat exchanger, and wherein the controller is configured to selectively transmit the switching control signals to the additional shutoff valve to selectively shut off or reduce a flow of the refrigerant to the heat exchanger.

5. The thermal management system of claim 1, wherein the compressor is an air conditioning compressor of a vehicle.

6. A vehicle comprising:
   a transmission;
   an electric traction motor connected to the transmission and operable for delivering motor torque to the transmission;
   a battery pack electrically connected to the electric traction motor and having a conductive cooling plate and plurality of battery cells, wherein each of the plurality of battery cells is in thermal communication with the conductive cooling plate; and
   a thermal management system comprising:
      a compressor operable for circulating refrigerant through the cooling plate to cool the battery cells;
      a plurality of flow control valves in fluid communication with the compressor, including a first flow control valve and a pair of shutoff valves downstream of the first flow control valve, the first flow control valve being operable for directing the refrigerant through the cooling plate in respective first and second directions of flow of the refrigerant with respect to a longitudinal axis of the battery pack when the first flow control valve is in a first position and a second position, respectively;
      a temperature sensor configured to measure a temperature of the battery pack; and
      a controller in communication with the temperature sensor and with the plurality of flow control valves, wherein the controller is programmed to receive the measured temperature and selectively transmit switching control signals to the plurality of flow control valves to command a change in direction or concentration of flow of the refrigerant through the conductive cooling plate, to thereby limit a temperature variance between the battery cells over time, and to receive input signals describing a speed of the compressor and to alternate an open/closed state of each of the pair of shutoff valves when the speed of the compressor is less than a threshold speed, such that the flow of refrigerant is alternately concentrated in a different portion of the battery pack.

7. The vehicle of claim 6, wherein the plurality of flow control valves includes a second flow control valve operable for directing the refrigerant from the cooling plate to the compressor regardless of the direction of flow of the refrigerant through the cooling plate.

8. The vehicle of claim 7, wherein the first and second flow control valves are 3-way flow control valves.

9. The vehicle of claim 6, further comprising a heat exchanger, wherein the plurality of flow control valves includes an additional shutoff valve in fluid communication with and upstream of the heat exchanger, and wherein the controller is configured to selectively transmit the switching control signals to the additional shutoff valve to selectively shut off or reduce a flow of the refrigerant to the heat exchanger.

10. A method of controlling a thermal management system for a battery pack having a plurality of battery cells in thermal communication with a conductive cooling plate, the method comprising:
- receiving a temperature of the battery pack from a temperature sensor, via a controller, while refrigerant is circulated through the conductive cooling plate via a compressor;
- receiving input signals via the controller describing a speed of the compressor;
- selectively transmitting switching control signals via the controller to a plurality of flow control valves positioned between the compressor and the battery pack in response to the received temperature, including transmitting the switching control signals to a pair of shutoff valves to selectively concentrate the flow of refrigerant in half of the battery pack when the speed of the compressor is less than a threshold speed; and
- controlling a direction or concentration of flow of refrigerant through the conductive cooling plate via the plurality of flow control valves in response to the switching control signals, thereby limiting a temperature variance between the battery cells over time.

11. The method of claim 10, wherein selectively transmitting the switching control signals to the plurality of flow control valves includes transmitting the switching control signals to a first and a second 3-way flow control valve to alternate a direction of flow of the refrigerant through the battery pack.

12. The method of claim 10, wherein the battery pack is in thermal communication with a heat exchanger, the method further comprising: selectively transmitting the switching control signals to an additional shutoff valve to selectively shut-off or reduce a flow of the refrigerant to the heat exchanger.

* * * * *